No. 757,313. PATENTED APR. 12, 1904.
J. JOYNT.
FLEXIBLE METALLIC PIPE COUPLING FOR RAILWAY CARS.
APPLICATION FILED NOV. 11, 1903.
NO MODEL.

ATTEST:

INVENTOR:—
James Joynt.
BY Higdon, Longan & Hopkins
ATTY'S.

No. 757,313.

Patented April 12, 1904.

UNITED STATES PATENT OFFICE.

JAMES JOYNT, OF ST. LOUIS, MISSOURI.

FLEXIBLE METALLIC PIPE-COUPLING FOR RAILWAY-CARS.

SPECIFICATION forming part of Letters Patent No. 757,313, dated April 12, 1904.

Application filed November 11, 1903. Serial No. 180,789. (No model.)

*To all whom it may concern:*

Be it known that I, JAMES JOYNT, a citizen of the United States, residing at St. Louis, State of Missouri, have invented certain new and useful Improvements in Flexible Metallic Pipe-Couplings for Railway-Cars, of which the following is a specification containing a full, clear, and exact description, reference being had to the accompanying drawings, forming a part hereof.

My invention relates to flexible metallic pipe-couplings for railway-cars; and it consists of the novel construction, combination, and arrangement of parts hereinafter shown, described, and claimed.

The object of my invention is to provide an improved flexible pipe-coupling especially adapted for use upon railway-cars in coupling the brake or steam-heating pipes.

Figure 1:
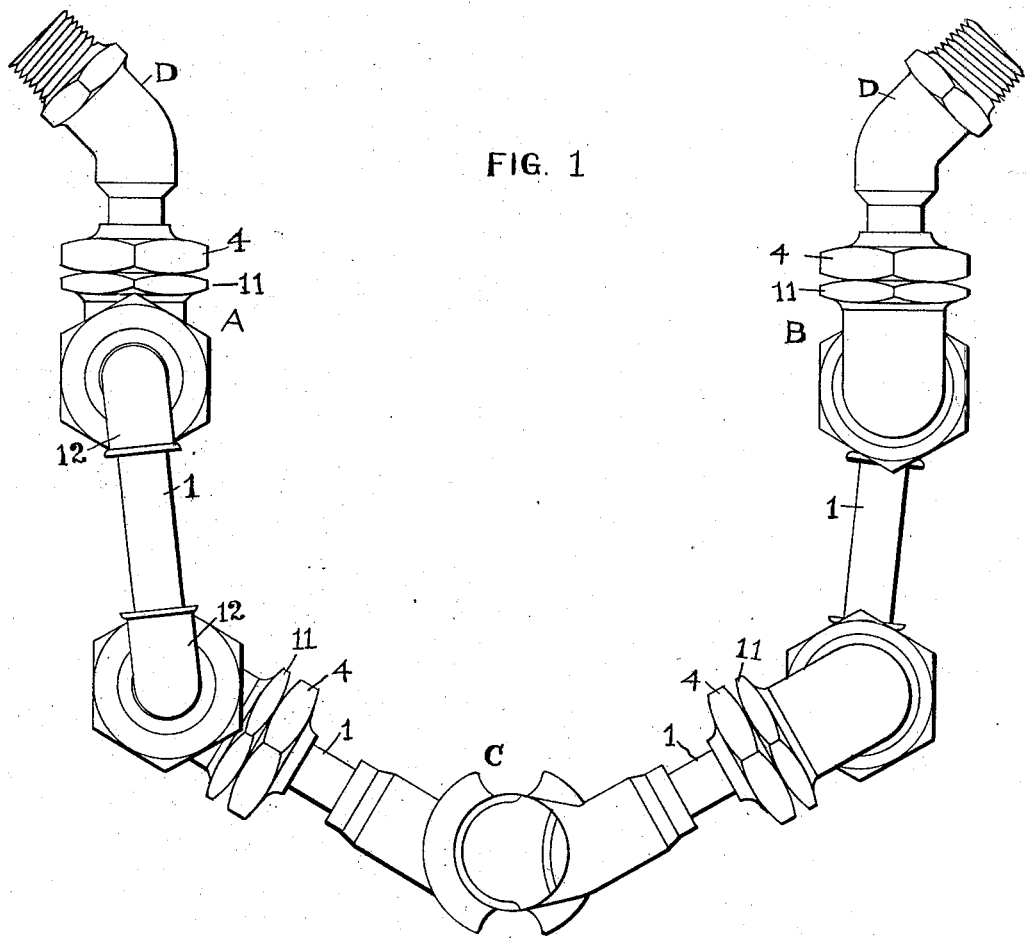
Figure 2:
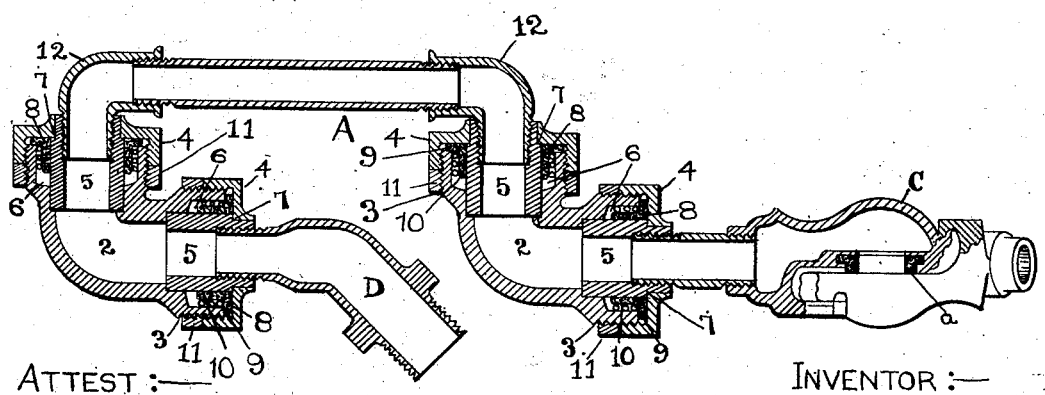

In the drawings, Figure 1 is a side elevation of my improved flexible metallic pipe-coupling. Fig. 2 is a sectional plan view of portions of the same with parts in a slightly-different position.

When my device is to be used as a pipe-coupling for railway-cars, it is constructed, as shown in Fig. 1, in two complete sections, A and B, which are coupled at their lower ends by means of a common separable coupling C and provided at their upper ends with the usual threaded pipe connections D, which are to be connected to the train-pipe. (Not shown.) The sections A and B are duplicates in construction, and each is composed of a series of short pipes 1, which are threaded into the adjacent parts of metallic swivel-joints in such a manner that a flexible coupling is produced thereby. In the present instance I make use upon each of the sections A and B of two pieces of pipe 1 and four different swivel-joints of the peculiar construction hereinafter described. Each swivel-joint is composed of an angular casing 2, having screw-threads 3 at its opposite ends; a cap 4, threaded upon each end of said casing; a swiveling nipple 5, mounted in a recess 6 in each end of each casing and retained therein by means of said cap bearing upon a shoulder 7, formed upon said nipple; an annular packing-ring 8, mounted in said recess and having flanges 9 and 10 extending at right angles to each other, and a spring coiled around one of the flanges of said packing-ring and mounted in the same recess therewith and adapted to urge said packing-ring into contact with the said cap and form a tight joint between said cap and said nipple. A lock-nut 11 is also mounted upon the threaded ends of said casings in order to lock said caps thereto.

12 indicates common elbows one end of which is threaded into the outer ends of the nipple 5 and the opposite end of which elbows is connected by pieces of pipe, such as 1.

The train-pipe connections D are threaded into the outer ends of the nipples 5 at the upper ends of the sections A and B, and the separable coupling C is connected to the adjacent nipples 5 of the device by means of short pipes 1, which have their ends threaded into said nipples and into the sections of said separable couplings. Said coupling is provided with the usual packing-ring *a*.

The operation is as follows: The couplings C may be separated, and thereby disconnect the lower ends of the sections A and B, when said ends may each be moved in any desired direction, owing to the swiveling action of the nipples 5 within the casings 2. This may also be done, of course, with the sections coupled, as shown in Fig. 1, without throwing any appreciable strain upon the pipe connections D.

My device possesses a number of advantages over the usual hose-coupling for railway-cars, among which may be mentioned greater strength and less liability to burst under heavy pressure. It is also much more durable than the usual hose.

I claim—

The improved flexible metallic pipe-coupling, comprising a series of short pieces of pipe, a pipe connection, and a double-ended casing having a socket in each end, a packing-ring mounted in each socket, a spring also mounted in each socket, a nipple having a shoulder near its outer end, a cap bearing upon said shoulder and threaded upon the exterior of said casing, and a nut for locking said cap against turning upon said casing, substantially as specified.

In testimony whereof I have signed my name to this specification in presence of two subscribing witnesses.

JAMES JOYNT.

Witnesses:
 ALFRED A. EICKS,
 M. G. IRION.